Figure 1:
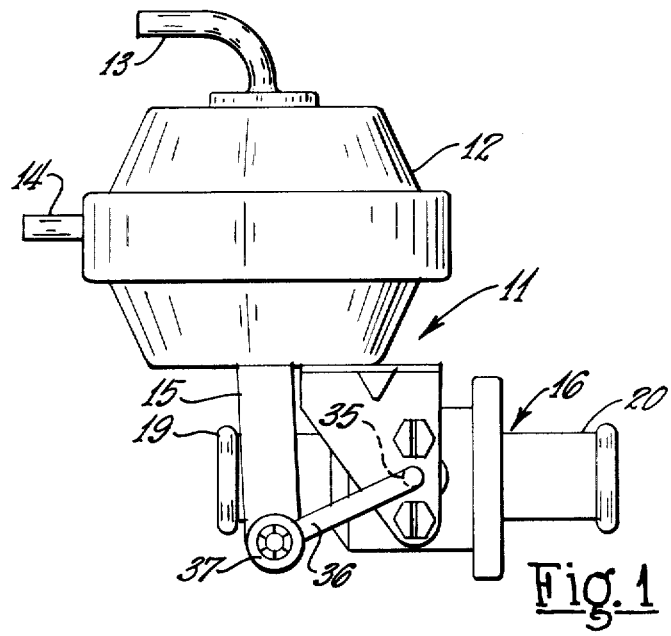

United States Patent

Obermaier

[15] 3,675,681
[45] July 11, 1972

[54] THREE-POSITION BUTTERFLY VALVE
[72] Inventor: Frank E. Obermaier, Park Ridge, Ill.
[73] Assignee: Eaton Corporation, Cleveland, Ohio
[22] Filed: Aug. 3, 1970
[21] Appl. No.: 60,259

[52] U.S. Cl...................137/625.3, 137/625.31, 251/305
[51] Int. Cl..........................F16k 1/22, F16k 1/52
[58] Field of Search..............137/625.31, 625.3; 251/305, 251/306, 208

[56] References Cited

UNITED STATES PATENTS

| | | | |
|---|---|---|---|
| 3,070,345 | 12/1962 | Knecht | 251/305 X |
| 1,167,145 | 1/1916 | Baverey | 137/625.31 |
| 3,363,645 | 1/1968 | Miller | 251/306 X |
| 3,409,269 | 11/1968 | Fawkes | 251/306 X |
| 3,568,975 | 3/1971 | Obermaier | 251/306 X |

*Primary Examiner*—Arnold Rosenthal
*Attorney*—Teagno & Toddy

[57] ABSTRACT

A butterfly fluid flow valve having a full-on, full-off, and an intermediate flow position. The intermediate flow position is provided by a bleed port formed in the butterfly element which can be closed off by contact of the butterfly element with a transverse wall portion formed within the valve body. The sealing lip of the butterfly element is adapted to seal against the interior wall of the valve body in the intermediate flow position to leave only the bleed port open.

6 Claims, 2 Drawing Figures

INVENTOR.
FRANK E. OBERMAIER
BY
TEAGNO & TODDY
ATTORNEYS

THREE-POSITION BUTTERFLY VALVE

This invention relates generally to fluid flow valves and more particularly to fluid flow valves of the butterfly type.

Butterfly valves in which a disc-shaped valve plate is rotatable between an open and closed positions are employed in a variety of applications because of their straight flow-through construction and their excellent dirt handling characteristics.

Valves of this type have recently found extensive use in automotive heating and air conditioning systems where they are operated by vacuum motors to regulate the flow of water through the heater core. Heretofore, such valves have been of the simple full-on, full-off type; however, as automotive heating and air conditioning systems become more complex, the need arises for a valve having at least one intermediate flow position.

Specifically, in certain heating and air conditioning systems heated and refrigerated air are mixed as necessary in order to provide a desired outlet temperature. While the heated air can be controlled by adjustment of air dampers, the adjustment is often critical and difficult to maintain. It has been found that by restricting the flow of water through the heater core, the temperature of the air leaving the heater can be reduced to around 100° as opposed to the normal 180°. This greatly reduces the criticality of the air setting required to obtain a proper mix.

Accordingly, an object of this invention is to provide a butterfly valve having three flow conditions—full-on, full-off, and an intermediate flow condition.

Another object of this invention is to provide such a butterfly valve which is leakproof in the fully closed position.

Another object of the invention is to provide a butterfly valve in which the intermediate flow rate can be closely controlled.

Another object of the invention is to provide a butterfly valve of this type which can be inexpensively manufactured.

Another object of the invention is to provide a butterfly valve which is adaptable to linear vacuum motor actuation.

To meet the above objectives, the invention provides a butterfly valve having a butterfly element or plate in which a small bleed orifice is formed such that a butterfly element position can be obtained in which there is a sealing relationship between the butterfly element and the valve body, leaving only the bleed orifice open. Sealing of the bleed orifice to obtain the fully closed position is effected by contact of the butterfly lobe in which the orifice is formed with a flat wall section formed in the interior of the valve body. The bleed orifice provides a valve position in which coolant flow through the heater core is restricted to permit a lower and more easily controlled heater output temperature.

Figure 2:
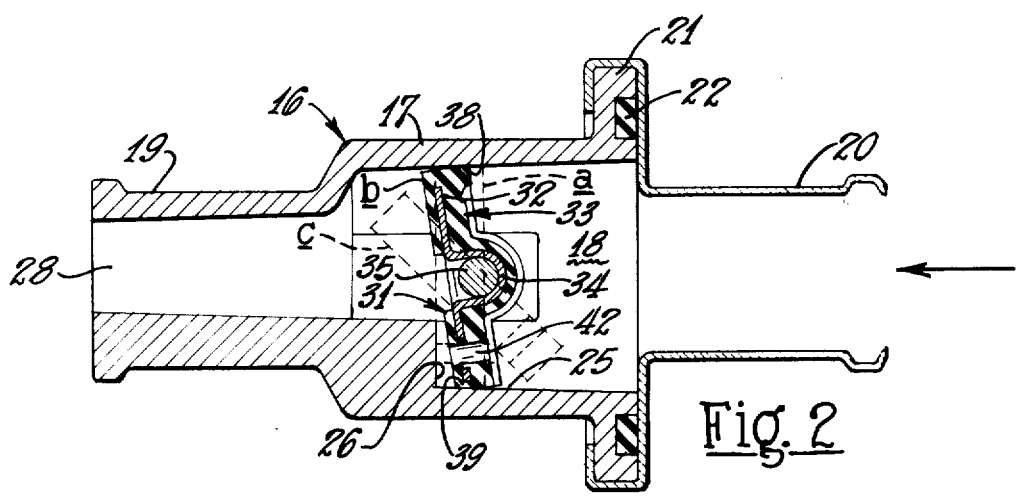

Other objects and advantages of the invention will be apparent from the following specification when taken in connection with the accompanying drawings, wherein:

FIG. 1 is an elevation view of a butterfly valve constructed in accordance with the invention and operated by a linear vacuum motor; and FIG. 2 is a cross-sectional view of the butterfly valve.

Referring to the drawings, in FIG. 1 there is illustrated a butterfly valve assembly designated generally by the numeral 11 and particularly adapted for use in an automotive heating and cooling system in which an intermediate flow position must be provided in addition to full on and full off. To this end the valve assembly includes a vacuum motor 12 for actuating the valve. The vacuum motor includes two vacuum ports 13 and 14 which are independently controlled to determine the stroke of an actuating rod 15 operatively connected to the butterfly valve 16. When vacuum is applied to one of the ports, the actuating rod is retracted to an intermediate position, and when vacuum is applied to both ports the actuating rod is fully retracted.

Referring particularly to FIG. 2 the butterfly valve 16 comprises a molded or cast housing 17 which includes a valve seat chamber 18 and an outlet connection 19 leading therefrom. The inlet connection 20 is a stamped member crimped over a flange portion 21 of the housing 17 and sealed thereto by means of a resilient sealing ring 22 within a groove formed in the end face of the flange.

The valve seat chamber includes a primary valve seat 25 formed by the internal diameter of the chamber and a secondary valve seat 26 formed by a transverse wall formed within the housing 17. The secondary valve seat is formed by making the bore 28 of the outlet connection 19 eccentric to the longitudinal axis of the housing 17, and by extending the bore 28 inward toward the primary valve seat so that the bore 28 intersects the valve seat chamber adjacent the butterfly valve element.

The butterfly valve element, designated generally by the numeral 31, comprises a metallic insert 32 and a resilient sealing element 33 molded about the insert. The sealing element can be rubber or one of the well-known rubber substitutes. The central portion 34 of the insert 32 is welded or otherwise fastened to a rod 35 extending diametrically through the valve seat chamber 18 of the housing 17. One end of the rod is formed into a crank arm 36 pivotally attached to the actuating rod 15 and retained by means of a snap ring 37.

The sealing element 33 of the butterfly valve includes lip portions 38 and 39 which are adapted to seal tightly against the primary seating surface 25 when the valve is in the full line position of FIG. 2 (designated b) as well as in the closed position, shown in broken lines and designated a.

To obtain the required intermediate or restricted valve position, a bleed orifice 42 is formed through the side of the butterfly element 31 which abuts the secondary seating surface 26. When the butterfly is in the full line position of FIG. 2 only this orifice is left open. When the butterfly is in the broken line position designated a, the orifice is sealed closed against the seating surface 26, and when the butterfly is in the broken line position designated c, the valve is fully open.

In operation, when the heating and air conditioning system requires a mixture of heated and refrigerated air, vacuum can be applied to one of the vacuum ports 13 or 14 to partially retract the actuating rod 15, placing the butterfly element 31 in position b to permit a restricted flow of coolant through the heater core. The result will be a mixture of refrigerated air and readily controllable heated air at approximately 100° F. When a full flow of coolant is required through the heater core, such as when the heater only is operated, vacuum is applied to the other port to fully retract the actuating rod 15 and fully open the butterfly valve.

I claim:

1. A fluid flow valve comprising a housing having an internal cylindrical bore of one diameter extending along one end portion of said housing and a larger diameter cylindrical bore extending along the opposite end portion of said housing, a portion of the intersection of said bores defining a flat transverse wall portion; a shaft extending transversely of said larger diameter bore; a butterfly valve element carried by said shaft and having a sealing lip having wiping engagement with said larger diameter bore, said butterfly valve element having an orifice formed therein and closed by contact of said element with said transverse wall portion.

2. The fluid flow valve of claim 1, in which said butterfly element is made from a resilient material compressible upon engagement with said larger diameter bore and with said transverse wall portion.

3. The fluid flow valve of claim 1, in which said sealing lip is adapted to sealingly engage a portion of said bore when said butterfly element is out of contact with said transverse wall.

4. The fluid flow valve of claim 1, in which said smaller diameter bore is parallel but eccentric to said larger diameter bore.

6. The fluid flow valve of claim 5, in which said outlet conduit means is cylindrical and is parallel but eccentric to said valve seat chamber.

* * * * *